F. E. BRIGHT.
ANTIFRICTION BEARING.
APPLICATION FILED JUNE 11, 1909.
1,071,693.
Patented Sept. 2, 1913.
2 SHEETS—SHEET 1.
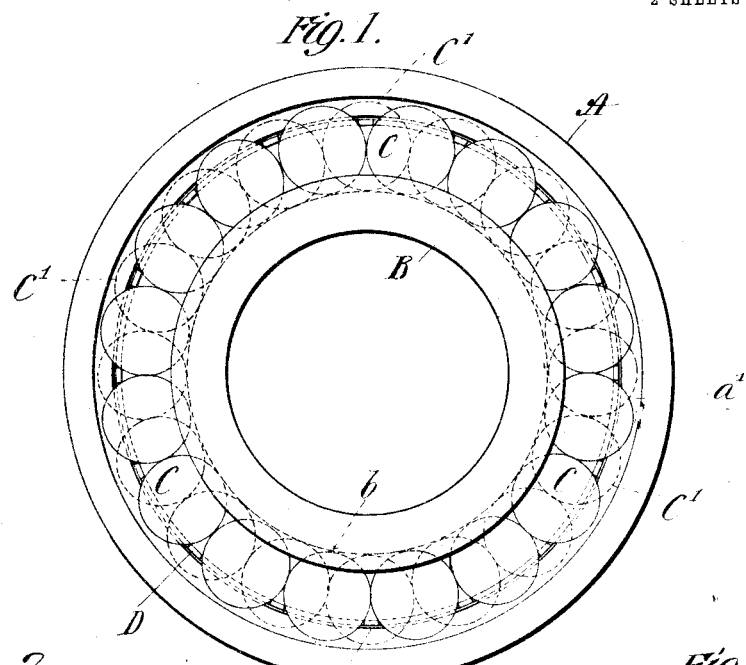
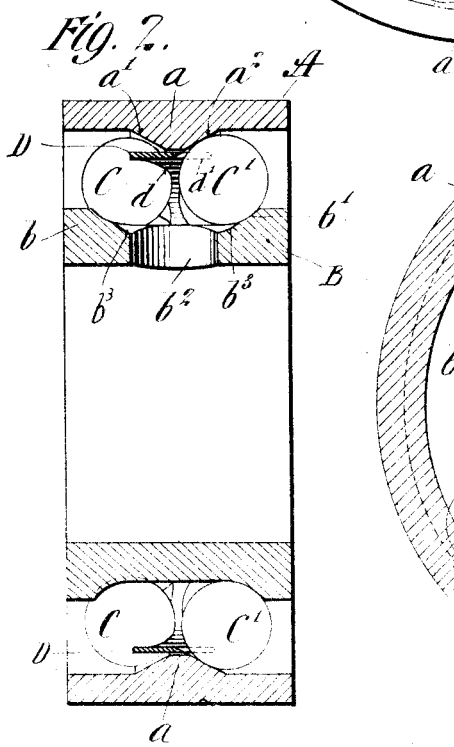
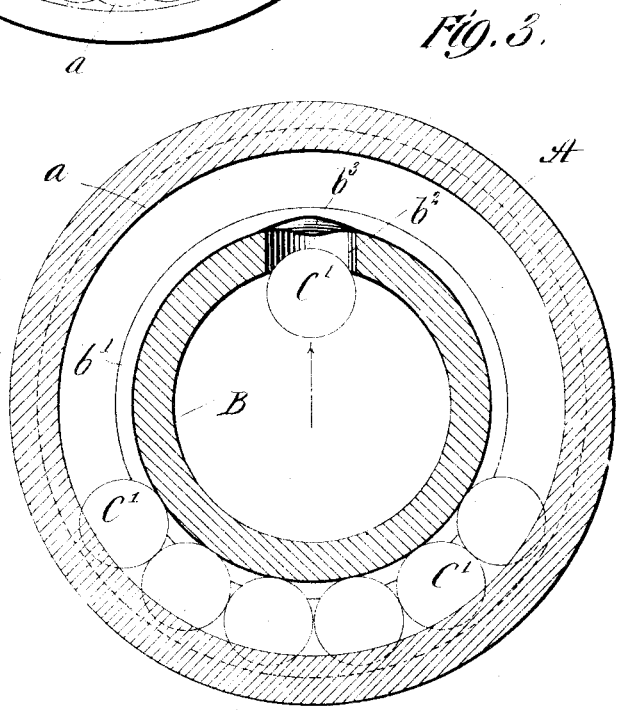
Witnesses:
Inventor:
FRED E. BRIGHT,
By his Attorneys
Rogers & Kennedy

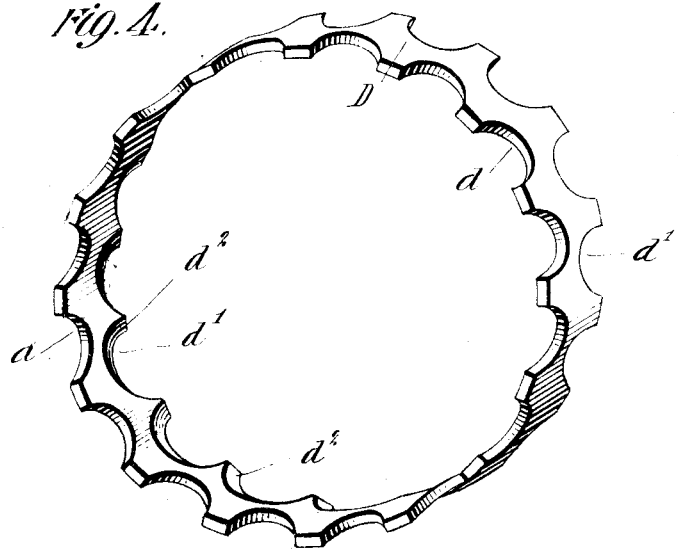
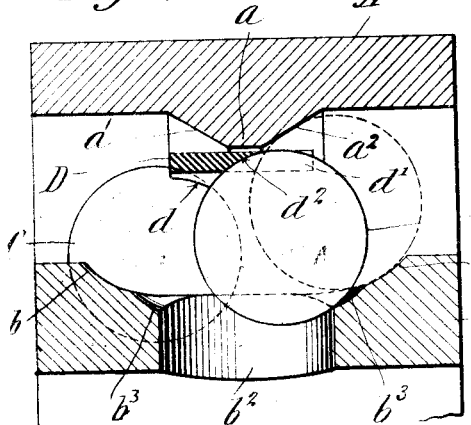
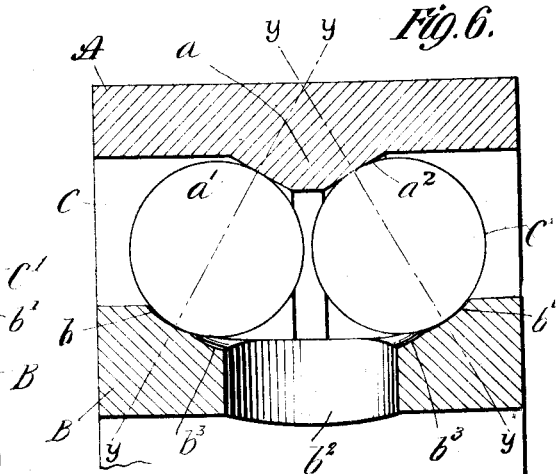
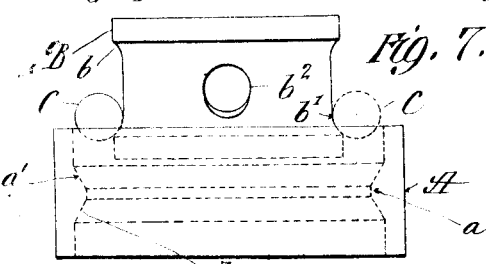

UNITED STATES PATENT OFFICE.

FRED EUGENE BRIGHT, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,071,693.  Specification of Letters Patent.  Patented Sept. 2, 1913.

Application filed June 11, 1909. Serial No. 501,531.

*To all whom it may concern:*

Be it known that I, FRED E. BRIGHT, a citizen of the United States, residing at Philadelphia, in the county of Philadelphia and State of Pennsylvania, have invented certain new and useful Improvements in Antifriction-Bearings, of which the following is a specification, reference being had therein to the accompanying drawing.

This invention has reference to ball bearings of the type in which two series of annularly disposed balls are arranged between inner and outer casing elements in such manner that the load sustained by the bearing will be distributed between the two series of balls.

The invention consists in a bearing of this type in which the casing elements are formed each as a single integral structure with uninterrupted and continuous ball tracks, and in which both series of balls may contain the full or substantially the full number or complement; whereby a unit-handling bearing is produced possessing a maximum degree of strength and supporting capacity, and in which, by reason of the continuous uninterrupted character of the ball tracks, the wear and friction will be reduced to a minimum.

Referring to the drawings: Figure 1 is a side elevation of my improved bearing; Fig. 2 is a longitudinal section of the same; Fig. 3 is a transverse sectional elevation, showing the manner in which the balls of one series are introduced through the filling opening; Fig. 4 is a perspective view of a form of spacing cage which may be employed to maintain the balls of the two series in spaced and staggered relations; Fig. 5 is a longitudinal sectional elevation on an enlarged scale, showing how the second series of balls are filled in on one side after the insertion of the spacing cage between the first series; Fig. 6 is a similar view, with the spacing cage omitted, and showing the balls of the two series disposed opposite each other; and Fig. 7 is an edge view, showing how the balls of the first series are introduced by longitudinal concentric displacement of the casing elements.

My improved bearing comprises an outer casing element A, an inner casing element B, and two series of anti-friction balls C, C'. The casing elements are each in the form of a ring constructed as an integral unitary structure, which rings, when the two series of balls are introduced between them, as will be presently described, are locked together by said balls, the whole thus constituting a bearing of the "unit-handling" type, which may be applied or removed or otherwise handled independently of the parts in connection with which the bearing is to be used, and without adjustment of the constituent parts thereof.

One of the casing rings, the outer one in the present instance, is formed with a central internal rib $a$, having inclined sides $a'$—$a^2$ constituting ball races on which the balls of the two series track in a single line of contact. Opposed to these ball races are two inclined races $b$—$b'$ on the inner casing element, on which the balls also track in a single line of contact, so that the two series of balls will give effective support to the loads, whether these loads are exerted endwise or radially, and with a minimum of friction, and absence of grinding or wear. As shown more particularly in Fig. 6, the tendency of the load acting on the outer ring A, is to separate the two series of balls and cause them to apply outward oppositely-acting pressures on the inner ring in the direction of the dotted lines $y$—$y$. By forming the inner ring as a single integral structure, it is under these conditions, well adapted to receive and sustain the outwardly acting forces, independently of any fastening or strengthening means, such as would be necessary in cases where the ring is formed of two longitudinal separable parts to permit assemblage of the balls.

In assembling the parts of my improved bearing, where both rings are integral, and in which both series of balls contain the full complement, the balls of one series may be introduced as shown in Fig. 7, where it will be seen that the rings are relatively displaced concentrically in a longitudinal direction, the inner ring being raised above the other ring to such extent that the distance between the inclined surface $a'$ and curved surface $b$ will be sufficient to freely admit the balls, the full number of which may then be introduced between the rings.

After this is done, the inner ring is returned to position centrally within the outer ring, and the other series of balls are introduced through a filling opening $b^2$, extending radially through the inner ring. Where this filling opening intersects the races the latter are cut away or beveled, as at $b^3$, thus producing a local enlargement of the filling opening sufficient to permit the balls of the second series to be sprung into place by slight pressure. It will be observed particularly in this connection that the filling opening thus disposed, produces no interruption in the ball paths of either of the two races on the inner ring, which ball paths, as heretofore described, are confined in each case to a single line, disposed as shown by the dotted lines $y$—$y$ a considerable distance outward beyond the points where the filling opening cuts the races. As a result of the construction described, the full number of balls may be introduced in the two series between the rings on opposite sides, and this without interrupting the continuity of the ball paths or weakening the rings, such as would result by forming the rings, or one of them, in separable sections to permit assemblage.

By the method of assemblage above described in connection with Fig. 7, it will be observed that the filling opening is employed to introduce the balls to but one side of the rib on the casing element.

It will be observed that by reason of the relative form and relation of the races on the two rings, the tendency of the load sustained by the bearing is to maintain the two series of balls outward beyond the edges of the filling opening, so that there will be no risk or liability of the accidental escape of the balls of either series when the bearing is in use.

In dismantling the bearing the operations described in connection with its assemblage are reversed, the balls of the second series being first forced by slight pressure inward through the radial filling opening $b^2$, and when all have been removed, the rings are displaced concentrically, as shown in Fig. 7, whereupon the other series of balls may be taken out. Instead, however, of introducing one series of balls by the relative displacement of the casing elements as just described, both series may be introduced through the radial filling opening, the balls being entered in succession in the opening, and sprung into place to one side or the other over the beveled surfaces $b^3$. So also other methods of assemblage may be resorted to, provided the continuity of the ball tracks is not interrupted; provided also the full, or substantially the full complement of balls may be introduced, and provided further the integral character of the casing elements is preserved.

It will be observed that when the bearing is assembled, with the two series of balls in place, the balls of one of the series act as a lock to prevent the parts of the bearing from separating, in addition to their load carrying functions.

While in the drawings I have shown the races $a'$, $a^2$ as flat, which is the form I prefer to adopt, they may, however, be curved without materially changing their functions or action, the only requirement being that the races be inclined.

For certain uses of the bearing, it is desirable that it be silent in operation, that is, that there be an absence of the click caused by the balls contacting with those in advance as they are relieved of load. To meet this requirement and to secure other well known advantages I prefer to employ a spacing ring or cage to maintain the balls of the two series in spaced relations. A form of cage for this purpose is represented in Fig. 4, and consists of a flat ring D having formed in its opposite edges, and alternately with each other, ball pockets or openings $d$, $d'$. The ring is adapted to be introduced into the bearing from the side and between the balls of the first series after they have been assembled. The vacant spaces in the ring are then brought in succession opposite the filling opening, and the balls passed through said opening and seated in the spaces, the edges of which are beveled as at $d^2$ to permit the balls to pass, the result being that the balls of the two series will be spaced by the cage in staggered relations.

By the expression "radial" or "radial or substantially radial" used in the claims in describing the filling opening, I mean to include in addition to a filling opening extending in a strictly radial direction as shown in the drawings, one which may be disposed in a general radial direction, such for instance as a filling opening somewhat inclined from the radial.

While in the drawings I have represented my improved bearing in the form which I prefer to adopt, and which in practice has been found to answer to an admirable degree the objects to be attained, I desire it to be understood that the invention is not limited to any specific form or arrangement of the parts, except in so far as such limitations are specified in the claims.

Having thus described my invention, its construction and mode of operation, what I claim and desire to secure by Letters Patent of the United States is as follows:

1. A ball bearing comprising inner and outer casing elements, each provided with two ball tracks forming two raceways between said elements, and two series of balls in said raceways, one of the casing elements being formed with a filling opening situated between the ball races and leading to both of them, and the edge of said filling opening terminating at the sides and free of the lines of contact of the balls with the races; whereby the races are continuous and uninterrupted and the escape of the balls is prevented.

2. In a ball bearing, the combination of inner and outer casing elements formed respectively with races, and two series of interposed balls, one of the casing elements being provided with a filling opening situated between the two raceways and leading to both of them, the edge of which filling opening terminates at the sides and free of the lines of ball contact with the races, and the said raceways being so formed and disposed that the load on the bearing will act to urge the two series of balls away from the edge of the filling opening; whereby the ball tracking surfaces are continuous and uninterrupted, and the accidental escape of the balls through the opening is prevented.

3. A ball bearing comprising inner and outer casing elements, each provided with two ball tracks forming two raceways between said elements, one of the casing elements being formed with a filling opening situated between the raceways and leading to one of them, the edges of said opening terminating at the sides and free of the lines of contact of the balls with the raceways; whereby the ball tracks are continuous and uninterrupted and the escape of the balls is prevented.

In testimony whereof I have affixed my signature in presence of two witnesses.

FRED EUGENE BRIGHT.

Witnesses:
MARY M. CALLA,
NETTIE L. HAHN